United States Patent [19]
Deane

[11] Patent Number: 5,929,489
[45] Date of Patent: Jul. 27, 1999

[54] DISPLAY MATRIX STRUCTURE WITH A PARASITIC TRANSISTOR HAVING A STORAGE CAPACITOR ELECTRODE AND COLUMN ELECTRODE AS SOURCE AND DRAIN REGIONS

[75] Inventor: Steven C. Deane, Red Hill, United Kingdom

[73] Assignee: U.S. Philips Corporation, New York, N.Y.

[21] Appl. No.: 08/969,504

[22] Filed: Nov. 13, 1997

[30] Foreign Application Priority Data

Dec. 17, 1996 [GB] United Kingdom ................... 9626487

[51] Int. Cl.$^6$ ...................................................... G02F 1/13
[52] U.S. Cl. .............................. 257/347; 257/59; 257/72; 257/53; 257/202; 257/222; 349/54; 349/82; 349/139; 349/143
[58] Field of Search ................................. 257/59, 72, 34, 257/53, 202, 222; 349/54, 82, 139, 143

[56] References Cited

U.S. PATENT DOCUMENTS

| | | | |
|---|---|---|---|
| 4,723,838 | 2/1988 | Aoki et al. | 350/336 |
| 5,130,829 | 7/1992 | Shannon | 359/59 |
| 5,238,861 | 8/1993 | Morin et al. | 437/51 |

OTHER PUBLICATIONS

"Very Simple a–Si;H TFT Fabrication Process for LCD–TV Application" by M. le Contellec et al., published in J. Non–Crystalline Solids vol. 97 & 98 (1987) pp. 297–300.

*Primary Examiner*—Fetsum Abraham
*Attorney, Agent, or Firm*—John C. Fox

[57] ABSTRACT

In a flat panel display or other large-area electronics device, each cell of a matrix comprises a thin-film switching transistor (T1) connected between a respective column conductor (CC) and a respective cell electrode ($C_{LC}$). Row conductors (RR) of the matrix comprise a conductive film pattern (14) on an insulating film pattern (13) on a semiconductor film pattern (12); portions (11a) of the semiconductor film pattern (11) provide channel regions of the switching transistors (T1), while portions (14a) of the conductive film pattern provide gate electrodes of the switching transistors (T1) connected to the respective row conductor (RR; 14b). Each cell also has a storage capacitor ($C_s$) formed with the row conductor (RR(n–1); 14b) of a neighbouring cell by a lower conductive film part (11c) present under the insulating and semiconductor film patterns (13 and 12) of the row conductor (RR(n–1); 14b) of the neighbouring cell. In order to reduce the effect of parasitic thin-film transistors (T2, T3) formed by these row conductors (RR) between said lower conductive film part (11c) and neighbouring column conductors (CC), the parasitic transistor channel regions which are provided by a part (12p) of the semiconductor film pattern (12) are dimensioned to have a length (L) greater than their respective width (W; W1), and their width (W; W1) is preferably made smaller than the width (W2) of the row conductor (RR; 14b) and its semiconductor film pattern (12) in the area of its storage capacitor ($C_s$). This smaller width (W; W1) of the row conductor (RR; 14b) in the area of the parasitic transistors (T2, T3) is preferably retained where the row conductor (RR; 14b) crosses over the neighbouring column conductors (CC).

10 Claims, 3 Drawing Sheets

DISPLAY MATRIX STRUCTURE WITH A PARASITIC TRANSISTOR HAVING A STORAGE CAPACITOR ELECTRODE AND COLUMN ELECTRODE AS SOURCE AND DRAIN REGIONS

BACKGROUND OF THE INVENTION

This invention relates to electronic devices comprising a matrix of cells each with a thin-film transistor (hereinafter termed TFT). The device may be a flat panel display (for example, an active-matrix liquid-crystal display), or another type of large-area electronic device (for example, a large-area image sensor or touch sensor, or a thin-film data store or memory device). The invention also relates to methods and layouts for manufacturing such devices.

There is much interest in developing thin-film circuit devices with TFTs and/or other thin-film semiconductor circuit elements on insulating substrates for large-area electronics applications. These circuit elements fabricated with portions of an amorphous or polycrystalline semiconductor film may form the switching elements in a cell matrix, for example in a flat panel display as described in U.S. Pat. No. 5,130,829 (our reference PHB 33646), the whole contents of which are hereby incorporated herein as reference material.

In order to reduce the number of photolithographic steps in fabricating a top-gate TFT, it is advantageous to use a simplified process such as a "two-mask step" (hereinafter termed "2-MS") technology as disclosed in the 1987 paper "Very simple a-Si:H TFT fabrication process for LCD-TV application" by M. le Contellec et al., published in J. Non-Crystalline Solids Vol. 97 & 98 (1987) pages 297ff. Similar 2-MS technology is described in United States Patent specification U.S. Pat. No. 5,238,861. The whole contents of this J. Non-Crystalline Solids 1987 paper and U.S. Pat. No. 5,238,861 are hereby incorporated herein as reference material. When this technology is used to fabricate top-gate switching TFTs of a matrix, the semiconductor thin-film pattern, typically of a-Si:H (hydrogenated amorphous silicon), not only provides the channel regions of the TFTs but extends also below (and has the same layout pattern as) each of the gate lines which provide the row conductors of the matrix. Thus, each row conductor comprises the highly conductive top-gate film pattern (typically of aluminium) on an insulating thin-film pattern (which also provides the gate dielectric) on the semiconductor thin-film pattern.

In the display devices disclosed in U.S. Pat. No. 5,238,861, each cell also has a storage capacitor formed by a lower conductive film part present under either a capacitive line or the row conductor of a neighbouring cell. These storage capacitors are provided to increase the charge retention time of the pixel, so countering discharge by leakage currents associated with the switching TFT and the liquid crystal medium of the display. The lower conductive film part of the storage capacitor is present under the insulating and semiconductor film patterns of the capacitive line or the row conductor of the neighbouring cell.

SUMMARY OF THE INVENTION

According to the present invention, there is provided an electronics device comprising a matrix of cells with row conductors and column conductors, [AS CLAIM 1] wherein each cell comprises a thin-film switching transistor having source and drain electrodes connected between a respective column conductor and a respective cell electrode, the row conductors comprise a conductive film pattern on an insulating film pattern on a semiconductor film pattern, portions of which provide channel regions of the switching transistors, while portions of the conductive film pattern provide gate electrodes of the switching transistors connected to the respective row conductor, and each cell has a storage capacitor formed with the row conductor of a neighbouring cell by a lower conductive film part present under the insulating and semiconductor film patterns of the row conductor of the neighbouring cell, characterised in that the row conductors form parasitic thin-film transistors between said lower conductive film part and neighbouring column conductors, the parasitic transistors comprising channel regions which are provided by a part of the semiconductor film pattern and which have a length greater than their respective width.

Thus, the present inventor has found that, when using a 2-MS like TFT technology, a parasitic transistor channel is present below the row conductor, in the parts of the semiconductor film pattern between said lower conductive film part and neighbouring column conductors, and that, in the absence of the dimensioning measures taken in accordance with the present invention, this parasitic channel provides an undesirable connection of the storage capacitor to the neighbouring column conductors when a row signal is applied to the neighbouring row conductor with which the storage capacitor is formed. As a result of this connection in the absence of the dimensioning measures taken in accordance with the present invention, the grey-scale accuracy of a display is reduced and undesirable cross-talk between cells can occur and so can distort, for example, the displayed image. However the adverse effect of the parasitic transistors can be reduced to an acceptable level by making the length L of the parasitic transistor channel regions greater than their respective width W, i.e. a W/L ratio for the parasitic TFT channel region of less than unity.

The respective width of the channel regions of the parasitic transistors of a respective row conductor may be made smaller than the width of the row conductor and its semiconductor film pattern in the area of its storage capacitor. In this way the effect of the parasitic transistor can be minimal, while increasing also the capacitance value of the storage capacitor. Preferably, this smaller width of the row conductor in the area of the parasitic transistors is retained also where the row conductor crosses over the neighbouring column conductors, so reducing capacitive coupling at the crossover.

For each of the parasitic TFTs, the W/L ratio of its channel region is less than unity by a factor the optimum value of which depends on the resistance of the column lines as compared with the TFT resistance. The resistance of the column lines is typically several orders of magnitude less than the channel resistance of the parasitic TFTs $T_2$ & $T_3$. Typically, the W/L ratio of the parasitic channel region is less than unity by a factor of 2 or more, for example. However the width W should not be so narrow that it increases undesirably the resistance of the row lines. Thus, typically, the length L of the channel region of each parasitic transistor may be between 2 to 3 times greater than its width W.

The cell electrode of each cell may have an extension area which is located under the row conductor of the neighbouring cell to form the storage capacitor. However more design freedom for film materials and thicknesses is possible when the cell electrode of each cell comprises a different film from the lower conductive film part of the storage capacitor, in which case this different film may be electrically connected through a via in an insulating film to an extension of said lower conductive film part.

The switching transistors may be located beside the row and column conductors and may comprise lateral extensions of the row and column conductors. Preferably the TFT (drain) electrode which is connected to the cell electrode is screened by the TFT (source) electrode which is connected to the column conductors. Thus, charging errors due to the parasitic TFTs can be prevented by adopting for the switching transistor a TFT design the drain of which is sandwiched between sources of the TFT, e.g. a two-source/one-drain TFT design like the 2-MS design in the J. Non-Crystalline Solids 1987 paper. A parasitic kick back occurs on the storage capacitor, but this does not matter assuming that the cell (pixel) is about to be re-addressed in the next row. During the frame time the parasitic TFTs can cause extra leakage from the storage capacitor; but, with a low W/L ratio for the parasitic TFT channel, this extra leakage should be small compared to the leakage of the cell/pixel TFT. There remains an increased capacitive load to the row, which slightly increases the row RC constant; this effect may restrict display application range to some extent, but probably only slightly. A 20–30% increase in row RC constant is estimated.

Preferably for the switching transistor, a TFT layout geometry is chosen which both screens the drain electrode (connected to the cell electrode) and is insensitive to slight misalignments in both X and Y directions. In one such form, the switching transistors may each have the following layout geometry in X and Y directions:

(i) in the X-direction a drain finger between forked source finger extensions from the respective column conductor, (ii) the source finger extensions being crossed in the Y direction by finger extensions from the respective row conductor which form a channel region and gate electrode of the transistor, and (iii) the free ends of both the drain and source fingers being beyond the area covered by the channel region and gate electrode of the transistor.

In another such form, the switching transistors may each have the following layout geometry in X and Y directions:

(i) in the X-direction a drain finger between forked source finger extensions from the respective column conductor, (ii) also in the X direction a forked finger pattern extending from the row conductor to form side-by-side channel regions below side-by-side insulated gate electrode parts of the same transistor, and (iii) the longitudinal sides of the drain & source fingers being partially overlapped by their respective gate electrode parts.

BRIEF DESCRIPTION OF THE DRAWINGS

These and other features in accordance with the present invention are illustrated specifically in embodiments of the invention, by way of example, with reference to the accompanying diagrammatic drawings, in which.

Figure 1:
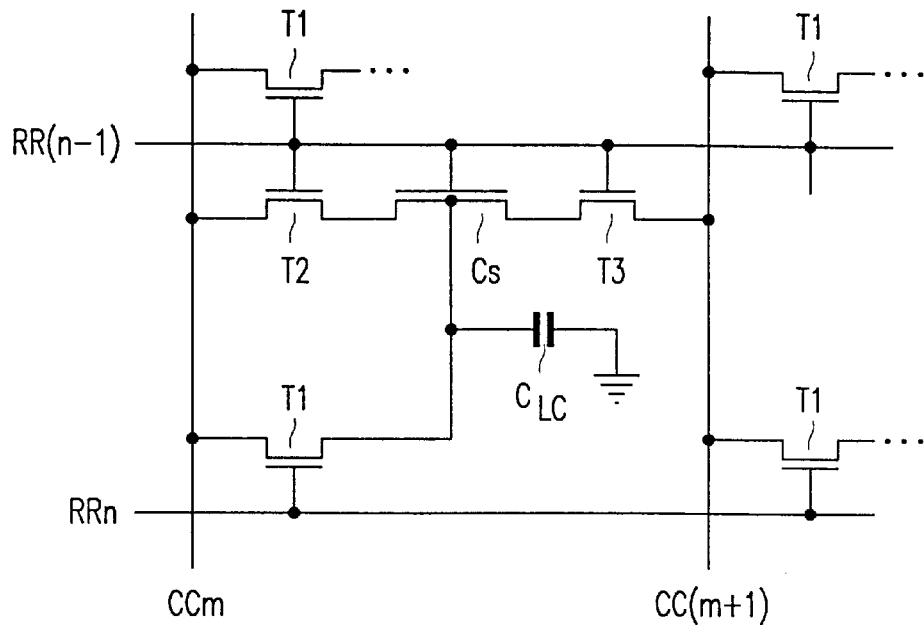
FIG. 1 is a schematic circuit diagram of a pixel cell of a display matrix in accordance with the present invention.

It should be noted that these Figures are diagrammatic and not drawn to scale. Relative dimensions and proportions of parts of these Figures have been shown exaggerated or reduced in size, for the sake of clarity and convenience in the drawings.

DESCRIPTION OF THE PREFERRED EMBODIMENTS

In the flat-panel matrix displays of FIGS. 1 to 6, each cell of the matrix comprises a top-gate thin-film switching transistor T1 connected between a respective column conductor CC and a respective pixel electrode $C_{LC}$. The TFT source and drain, the column conductors CC, and the cell electrodes $C_{LC}$ may all be formed as portions of, for example, an ITO (indium tin oxide) film pattern 11 on an insulating substrate 10 of the display. The matrices of FIGS. 1 to 6 are formed using 2-MS thin-film technology, and so their row conductors RR comprise a conductive film pattern 14 (e.g. of Al) on an insulating film pattern 13 (e.g. of silicon nitride) on a semiconductor film pattern 12 (e.g. of a-SiH). Portions 12a of the semiconductor film pattern 12 provide channel regions of the switching transistors T1, while portions 14a of the conductive film pattern 14 provide gate electrodes of the switching transistors T1 connected to the respective row conductor RR. In the 2-MS process, the first mask defines the pattern in film 11, and the second mask defines the pattern in films 12, 13 and 14.

It should be noted that other terminology is often used in the art, to designate these component parts. Thus, row and column conductors of a matrix are also known as lines (e.g. the row conductors may be termed addressing lines and/or row lines and/or gate lines). The pixel electrodes may be termed cell electrodes. The TFT source and drain are also termed source electrode and drain electrode and/or source and drain fingers (when of elongate or stripe geometry). In the following description, the TFT electrode connected to the column conductor CC is termed the source, whereas that connected to the pixel (or cell) electrode $C_{LC}$ is termed the drain. The column conductor CC may (in this case) also be termed the source line. However, it is known in the art to designate as "the drain" that TFT electrode which is connected to the column conductor CC, so that the TFT electrode connected to the pixel (or cell) electrode is (in this notation) termed the source.

Each cell also has a storage capacitor $C_s$ formed with the row conductor RR(n−1);14b of a neighbouring cell, by including a lower conductive film part 11c under the insulating and semiconductor film patterns 13 and 12. The insulating film 13 of the row conductor RR(n−1);14b of that neighbouring cell provides the dielectric of this storage capacitor $C_S$.

In the matrices of FIGS. 1 to 6, parasitic thin-film transistors T2, T3 are formed by the row conductors RR, between the lower conductive film part 11c of the storage capacitors $C_S$ and the neighbouring column conductors CC. In order to reduce the effect of these parasitic thin-film transistors T2, T3, special dimensioning measures are taken in accordance with the present invention in the cell layout of the row conductors RR. According to these measures, the parasitic transistor channel regions (which are provided by a part 12p of the semiconductor film pattern 12) are dimensioned to have a length L greater than their respective width W; W1.

Such arrangements of matrix cells (with storage capacitors $C_s$ and reduced parasitic TFTs T2 and T3 in accordance with the present invention) may be incorporated as a modification of a display matrix such as disclosed in, for example, the said J. Non-Crystalline Solids 1987 paper and/or FIG. 1 of U.S. Pat. No. 5,130,829 and/or FIG. 11 or 13 of U.S. Pat. No. 5,238,861.

Figure 2:
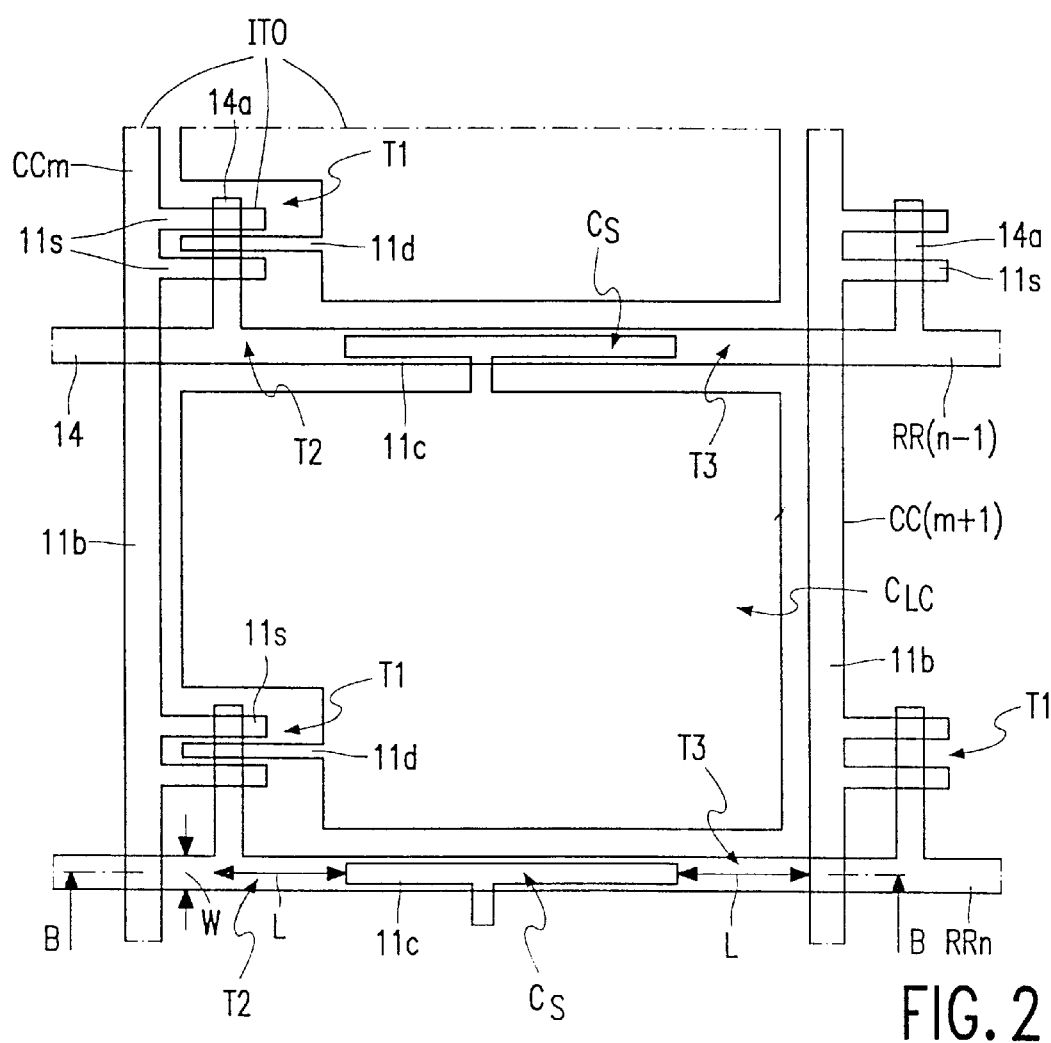
FIG. 2 is a plan view of one example of the pixel cell embodiment of FIG. 1, showing the 2 mask layout patterns.

With the storage capacitor $C_S$ coupled to the previous row line RR(n-1), as illustrated by example in FIGS. 1 and 2, then during the previous row pulse a parasitic series pair of TFTs T2 & T3 is active between adjacent columns CCm, CC(m+1). The column resistance is comparatively low because of its capacitive load, and so these parasitic TFTs T2 & T3 (of low W/L) should not cause a significant load. The width W of the a-Si:H channel regions of T2 & T3 is the width of the row conductor (i.e. the gate line) of the matrix. In the layout illustrated in FIG. 2, the a-Si:H channel length of T3 is the length L of the row conductor RR over the gap between the storage capacitor $C_S$ and the next column conductor CC(m+1); the a-Si:H channel length of T2 is the length L of the row conductor RR over the gap between the storage capacitor $C_S$ and either the previous column conductor CCm or the source electrode of the pixel switching TFT T1, whichever of these two lengths is the shorter. For each of the parasitic TFTs T2 & T3 the W/L ratio of its a-Si:H channel region is less than unity, for example by a factor of 2 or more, depending on the resistance of the column lines. The resistance of the column lines is typically several orders of magnitude less than the channel resistance of the parasitic TFTs T2 & T3.

Figure 3:
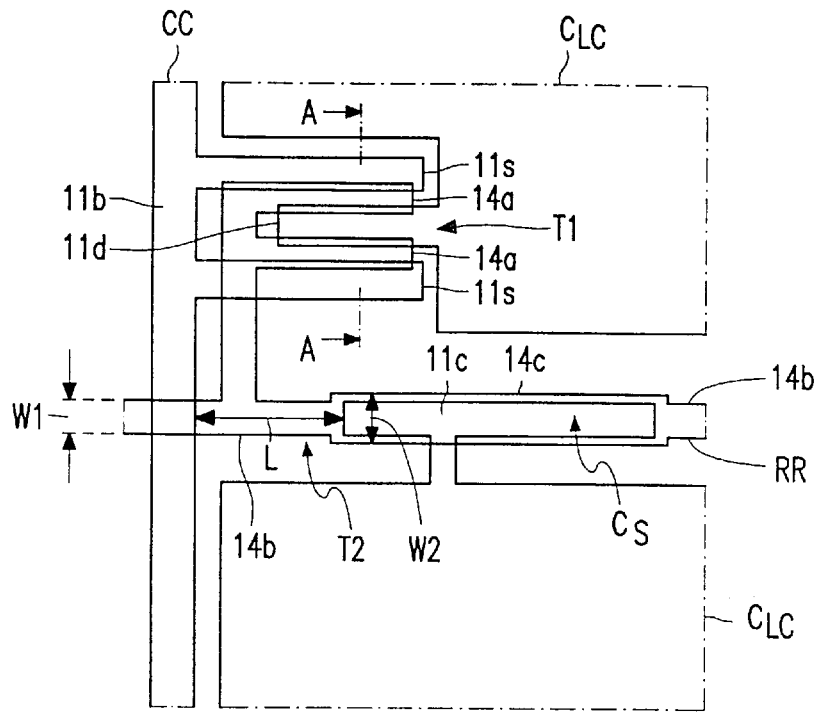
FIG. 3 is a plan view of a modified example of gate-line layout which may be used for the switching TFT $T_1$ and the storage capacitor $C_S$ in the embodiment of FIG. 2.
Figure 4:
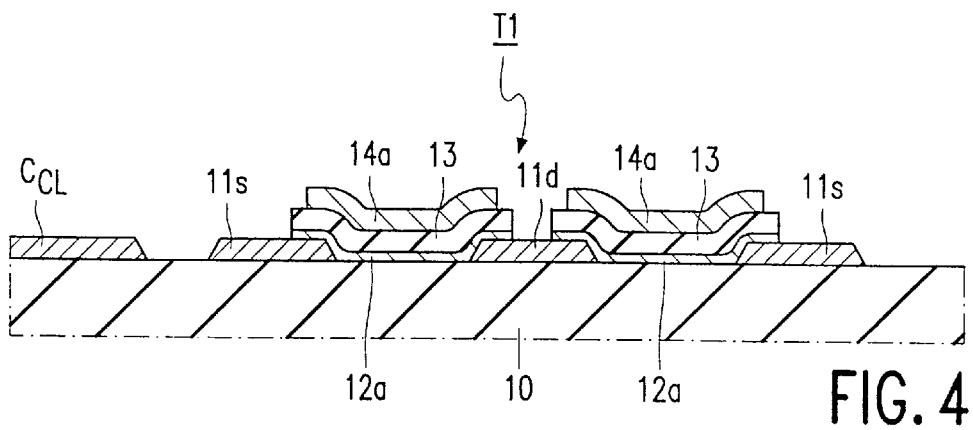
FIG. 4 is a schematic cross-sectional view along the line A—A of FIG. 3, through the switching TFT $T_1$ on the device substrate.
Figure 5:
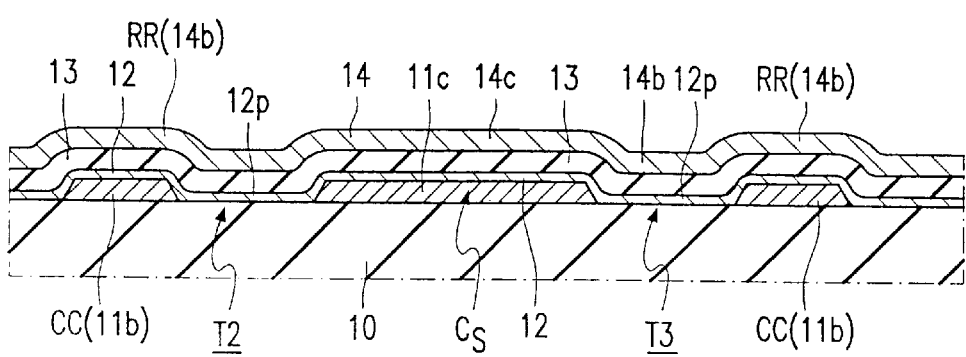
FIG. 5 is a schematic cross-sectional view along the line B—B of FIG. 2, i.e. along a row line (top-gate line) of the thin-film circuit structure on the device substrate.
Figure 6:
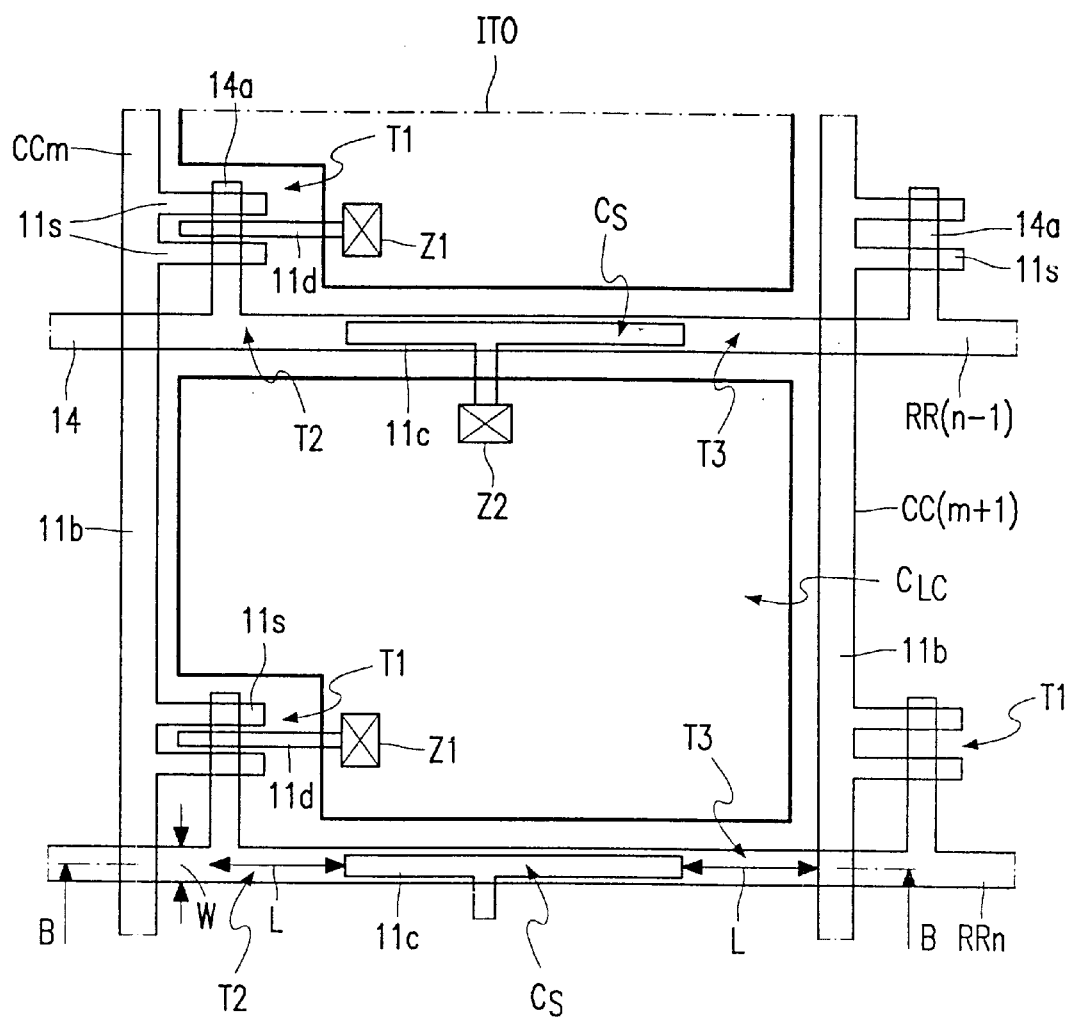
FIG. 6 is a plan view of a modification of the pixel layout of FIG. 2, in which the pixel electrode $C_{LC}$ is an upper-level film pattern defined in a 3rd mask step.

The channel regions of the matrix TFTs T1 are provided by the semiconductor film pattern 12, for example of a-Si:H. In the matrices of FIGS. 1 to 6, this film pattern 12 of homogenous semiconductor material extends below (and has the same layout pattern as) the row (top-gate) lines 14 and intermediate insulator (e.g. a SiN gate dielectric). Thus the quadruple film structure 11,12,13,14 provides several circuit elements in the FIGS. 1 to 6 matrices, namely: crossing row and column lines RR and CC; switching transistors T1; storage capacitors $C_S$; and the undesired parasitic TFTs T2 and T3 present in this film structure 11,12,13,14 of the row line (RR) between the column (source) lines CC and the intermediate storage-capacitor $C_S$. A specific cross-section example is illustrated in FIGS. 4 and 5. The layout geometry of the parasitic TFTs T2 and T3 is designed to give the channel regions of these parasitic TFTs T2 and T3 a width W which is less than their length L. Typically, the length L is, for example, 2 to 3 times greater than the width W. Specific layout examples are illustrated in FIGS. 2, 3 and 6. Furthermore, the width W of the channel regions 12p of these parasitic TFTs T2 and T3 may be made less (W1) than the width (W2) of the area of the row (top-gate) lines RR which forms the storage capacitors $C_S$. A specific example is illustrated in FIG. 3. An increased capacitance value for $C_S$ can be obtained with the larger width W2. The smaller width W1 may be retained also for the crossover of the row conductor RR with the column conductor CC, as illustrated in FIG. 3.

In one advantageous form, the present invention provides a simplified matrix integration scheme of crossing conductors RR and CC, top-ate TFTs T1, storage capacitors $C_S$, and pixel electrodes CLC of a display matrix (or other matrix-cell electrodes $C_{LC}$ of another type of large-area electronics device), wherein the pixel/cell electrodes $C_{LC}$ of each successive cell row n have an extension which provides the film part 11c located under the previous top-gate line RR(n-1) of the switching TFTs T1 of tie previous cell row (n-1). This extension forms the storage capacitor $C_S$ under the previous top-gate line RR(n-1). Specific examples are illustrated in FIGS. 2 and 3.

In another advantageous form, the present invention provides a simplified matrix integration scheme of crossing conductors RR and CC, storage capacitors $C_S$ and top-gate TFTs T1 of a display matrix or another large-area electronics device, wherein the storage capacitors $C_S$ of each successive cell row n are formed under the previous top-gate line RR(n-1), by an extended electrode area 11c which is located under the previous top-gate line RR(n-1) of the switching TFTs T1 of the previous cell row (n-1) and to which a matrix-cell electrode $C_{LC}$ is electrically connected (for example at a via Z2 in an intermediate insulating film). A specific example is illustrated in FIG. 6. The pixel/cell electrode CLC may be an upper level pattern (e.g. of ITO for a display pixel) defined in a 3rd mask step and electrically connected (at a via Z1) to a drain finger 11d of TFT T1 and (at the via Z2) to an extension of the bottom electrode 11c of the storage capacitor $C_S$ of the previous row line n-1. This FIG. 6 arrangement with an upper-level electrode $C_{LC}$ can be used for displays when the bottom conductive film 11 is of non-transparent material (for example an alloy of chromium and/or molybdenum). It is also particularly convenient for other matrix devices (e.g. touch sensors) with different cell electrodes $C_{LC}$.

Each of the switching TFTs T1 may have a drain electrode 11d screened between two source electrodes 11s which may be extensions (e.g. fingers) of the source line CC. Thus, the drain electrode 11d may be separated from the electrode areas of the storage capacitors $C_S$ of the next row n by the channel region 12a of the switching TFT T1 as well as by the parasitic TFTs T2 and T3. The drain electrode 11d may be an extension (e.g. a finger) of a pixel/cell electrode $C_{LC}$, or may be otherwise electrically connected thereto. Thus, this pixel/cell electrode $C_{LC}$ of one row n-1 may be separated from the storage capacitor extension 11c of the pixel/cell electrode $C_{LC}$ of the next row n by the channel region 12a of switching TFT T1 as well as by the parasitic TFTs T2 and T3. Specific examples are illustrated in FIGS. 2, 3, 4 and 6.

It should be noted that the TFT layouts for the switching TFT T1 in both FIG. 2 (& 6) and FIG. 3 are two different examples which have, in accordance with another aspect of the present invention, a degree of alignment tolerance in both the Y-direction (column direction) and the X-direction (row direction).

Furthermore these TFTs T1 of FIGS. 2, 3, 4 and 6 are located beside the source and gate lines (column and row lines) CC and RR and not under these lines of the matrix.

The FIG. 3 layout is currently preferred over the FIG. 2 layout for $T_1$, in so far as it has a lower parasitic (overlap) capacitance and so gives less kick-back in operation. However the TFT of FIG. 2 has a simpler geometry than that of FIG. 3.

In large, high resolution AMLCDs a significant issue is the kick-back voltage of the switching TFT T1 used to address each pixel. This should be reduced, and more importantly variations across the display must be reduced to a minimum. A significant cause of kick-back variation can occur with the alignments in adjoining exposure blocks in a situation when the total matrix area is exposed sequentially in blocks. Misalignment between the upper and lower mask patterns in the different blocks causes a sudden change in the kick-back charge and so visible artefacts in the displayed picture. This is more visible than a slow change in kick-back charge across the display, for example caused by etch rate variations. Thus, it is desirable to have for Ti a TFT design where the kick-back charge is insensitive to normal misalignments, particularly but not exclusively when the display is made from separate exposure blocks. Thus, it is easier to make large displays of high quality with alignment tolerant TFT layouts.

Thus, in one preferred form, the present invention also permits the switching TFT T1 to have a top-gate TFT geometry insensitive to slight misalignments in both X and Y directions, and comprising (for example as illustrated in the FIGS. 3 & 4 layout):

(i) in the X-direction a drain electrode lid between 2 interconnected source electrode parts 11s (for example, fingers), (ii) also in the X direction a forked 2-part (for example, 2-finger) semiconductor film pattern 12 forming 2 side-by-side TFT channels 12a (for example, stripes) below 2 side-by-side insulated-gate parts 14a (for example, stripes) of the same forked layout pattern, and (iii) in which each TFT channel 12a below the 2 insulated gate parts 14a partially overlaps the long sides of their respective drain & source fingers 11d and 11s.

This preferred top-gate TFT geometry may comprise more than one such drain electrode 11d, more than 2 such source electrode parts 11s, and more than 2 such TFT channels 12a below insulated gate parts 14a. Thus, The TFT T1 may have interdigitated source and drain electrodes 11s and 11d, which are partially overlapped by an interdigitated semiconductor film pattern forming TFT channel stripes 12a below insulated gate parts 14a.

In another form (for example as illustrated for T1 in the layouts of FIGS. 2 and 6), the top-gate TFT geometry insensitive to slight misalignments in both X and Y directions, has:

(i) in the X-direction a drain electrode 11d between two interconnected source electrode parts 11s (for example, fingers) which are crossed (ii) in the Y direction by a semiconductor film pattern forming a TFT channel part 12a (for example, a stripe) below an insulated gate part 14a (for example, a stripe) of the same layout pattern, and (iii) in which the free ends of both the drain and source parts (stripes) 11d and 11s are beyond the area covered by the channel/gate 12a,14a.

This advantageous top-gate TFT geometry also may comprise more than one such drain electrode 11d, more than 2 such source electrode parts 11s, and more than 2 such TFT channels 12a below insulated gate parts 14a.

Although the embodiments of the invention illustrated in FIGS. 1 to 6 relate to active-matrix liquid-crystal displays, it will be evident that the present invention may applied to reduce parasitic TFTs which are associated with row conductors in flat panel displays with other types of display media and also in other large-area matrix devices when manufactured using a 2-MS thin-film technology. These other electronic devices may be, for example, a large-area image sensor or touch sensor, or a thin-film data store or memory device. Such devices comprise a matrix of cells each with a switching TFT connected between a respective column conductor and a respective cell electrode, wherein the geometry and type of the cell electrode and cell structure determines the type of device formed.

Other modifications and variations will be apparent to persons skilled in the art. Such modifications and variations may involve other features which are already known in the manufacture of active-matrix liquid-crystal displays and other large-area electronic devices, TFT, capacitor and other thin-film circuit element design and circuitry, and other semiconductor devices, and which may be used instead of or in addition to features already disclosed herein. Although specific patent claims have been formulated in this application to particular combinations of features, it should be understood that the scope of the disclosure of the present application includes any and every novel feature or combination of features disclosed herein either explicitly or implicitly and together with all such modifications and variations, whether or not relating to the main inventive concepts disclosed herein and whether or not it mitigates any or all of the same technical problems as the main inventive concepts. The applicants hereby give notice that new patent claims may be formulated to such features and/or combinations of such features during prosecution of the present application or of any further application derived therefrom.

I claim:

1. An electronics device comprising;

a matrix of cells defined by a matrix of cell electrodes;

a matrix of row conductors and column conductors associated with the cells;

for each cell a thin-film switching transistor having source and drain electrodes connected between a respective column conductor and a respective cell electrode a gate electrode connected to a row electrode, and a channel region formed from an intermediate semiconductor layer;

for each cell a storage capacitor formed from an extension of the cell electrode underneath the row conductor of a neighbouring cell with the overlying portion of the row electrode and an intermediate insulating layer, parasitic thin-film transistors present between the storage capacitors and at least one of the neighbouring column conductors, each parasitic transistor comprising the at least one column conductor and the cell electrode extension of the storage capacitor as source and drain regions, the portion of the row electrode extending between the storage capacitor and the at least one of the neighboring column conductors as a gate region, a part of the semiconductor layer forming the channel region of the thin film switching transistors and extending under the row electrode between the at least one of the neighboring column conductors and the cell electrode extension of the storage capacitor as a channel region, and an intermediate insulating layer, characterized in that the channel regions of the parasitic thin-film transistors have a length greater than their respective width.

2. A device as claimed in claim 1, further characterised in that the respective width of the channel regions of the parasitic transistors of a respective row conductor is smaller than the width of the row conductor and its semiconductor film pattern in the area of its storage capacitor.

3. A device as claimed in claim 2, further characterised in that this smaller width of the row conductor in the area of the parasitic transistors is retained where the row conductor crosses over the neighbouring column conductors.

4. A device as claimed in any one of claims 1 to 3, further characterised in that the length of the channel region of each parasitic transistor is between 2 to 3 times greater than its width.

5. A device as claimed in claim 1, further characterised in that the cell electrode of each cell has an extension area which is located under the row conductor of the neighbouring cell to form the storage capacitor.

6. A device as claimed in claim 1, further characterised in that the switching transistors are located beside the row and column conductors and comprise lateral extensions of the row and column conductors.

7. A device as claimed in claim 6, further characterised in that the switching transistors each have the following layout geometry in X and Y directions:

(i) in the X-direction a drain finger-between forked source finger extensions from the respective column conductor, (ii) the source finger extensions being crossed in the Y direction by finger extensions from the respective row conductor which form a channel region and gate electrode of the transistor, and (iii) the free ends of both the drain and source fingers being beyond the area covered by the channel region and gate electrode of the transistor.

8. A device as claimed in claim 6, further characterised in that the switching transistors each have the following layout geometry in X and Y directions:

(i) in the X-direction a drain finger between forked source finger extensions from the respective column conductor, (ii) also in the X direction a forked finger pattern extending from the row conductor to form side-by-side channel regions below side-by-side insulated gate electrode parts of the same transistor, and (iii) the longitudinal sides of the drain & source fingers being partially overlapped by their respective gate electrode parts.

9. A device as claimed in claim 1, in the form of a flat panel display, the cell electrodes being transparent pixel electrodes of a display matrix.

10. An electronics device comprising;

a matrix of cells defined by a matrix of cell electrodes;

a matrix of row conductors and column conductors associated with the cells;

for each cell a thin-film switching transistor having source and drain electrodes connected between a respective column conductor and a respective cell electrode a gate electrode connected to a row electrode, and a channel region formed from an intermediate semiconductor layer;

for each cell a storage capacitor formed from a separate conductive layer underneath the row conductor of a neighbouring cell with the overlying portion of the row electrode and an intermediate insulating layer, the separate conductive layer having a portion which extends underneath the cell electrode and is electrically connected to the cell electrode through a via in an intervening insulating layer;

parasitic thin-film transistors present between the storage capacitors and at least one of the neighbouring column conductors, each parasitic transistor comprising the at least one column conductor and the separate conductive layer of the storage capacitor as source and drain regions, the portion of the row electrode extending between the storage capacitor and the at least one of the neighboring column conductors as a gate region, a part of the semiconductor layer forming the channel region of the thin film switching transistors and extending under the row electrode between the at least one of the neighboring column conductors and the separate conductive layer of the storage capacitor as a channel region, and an intermediate insulating layer, characterized in that the channel regions of the parasitic thin-film transistors have a length greater than their respective width.

* * * * *